United States Patent

Skura

[11] Patent Number: 4,632,665
[45] Date of Patent: * Dec. 30, 1986

[54] POWER TRANSMISSION BELT AND METHOD

[75] Inventor: William A. Skura, Naugatuck, Conn.

[73] Assignee: Uniroyal Power Transmission Company, Inc., Middlebury, Conn.

[*] Notice: The portion of the term of this patent subsequent to Jul. 12, 2000 has been disclaimed.

[21] Appl. No.: 712,574

[22] Filed: Mar. 15, 1985

Related U.S. Application Data

[63] Continuation-in-part of Ser. No. 471,923, Mar. 2, 1983, Pat. No. 4,514,179.

[51] Int. Cl.$^4$ ............................................. F16G 1/28
[52] U.S. Cl. .................................... 474/205; 474/268
[58] Field of Search ................ 474/204, 205, 266–268

[56] References Cited

U.S. PATENT DOCUMENTS

| | | | |
|---|---|---|---|
| 2,507,852 | 5/1950 | Case | 74/237 |
| 3,078,206 | 2/1963 | Skura | 156/140 |
| 3,724,284 | 4/1973 | Eng et al. | 74/234 |
| 3,756,091 | 9/1973 | Miller | 74/231 C |
| 3,784,427 | 1/1974 | Griffin | 156/139 |
| 3,937,094 | 2/1976 | Cicognani | 74/231 C |
| 4,037,485 | 7/1977 | Hoback | 74/229 |
| 4,099,422 | 7/1978 | Cicognani et al. | 74/231 C |
| 4,169,393 | 10/1979 | Wetzel et al. | 74/233 |
| 4,265,937 | 5/1981 | Takano | 474/205 |
| 4,302,197 | 11/1981 | Kimura et al. | 474/266 |
| 4,392,842 | 7/1983 | Skura et al. | 474/205 |
| 4,504,256 | 3/1985 | Matsumura et al. | 474/250 |
| 4,514,179 | 4/1985 | Skura | 474/204 |

Primary Examiner—Stephen J. Novosad
Assistant Examiner—Bruce M. Kisliuk
Attorney, Agent, or Firm—Jack Posin

[57] ABSTRACT

A toothed, positive drive, power transmission belt of the type having an endless substantially inextensible tensile member to which are secured belt teeth having a curvilinear cross-section and covered by an outer non-stretch fabric cover. In the body of each tooth is a layer of fabric reinforcement separated from the outer cover fabric of the belt tooth and of the land region between belt teeth by a cushion layer of elastomeric material of varying thickness so that the outer tooth portions are free to flex while the inner portion of the tooth is reinforced against shear. The resulting construction provide belts having substantially longer belt life than conventional belts at relatively high horsepower application.

22 Claims, 3 Drawing Figures

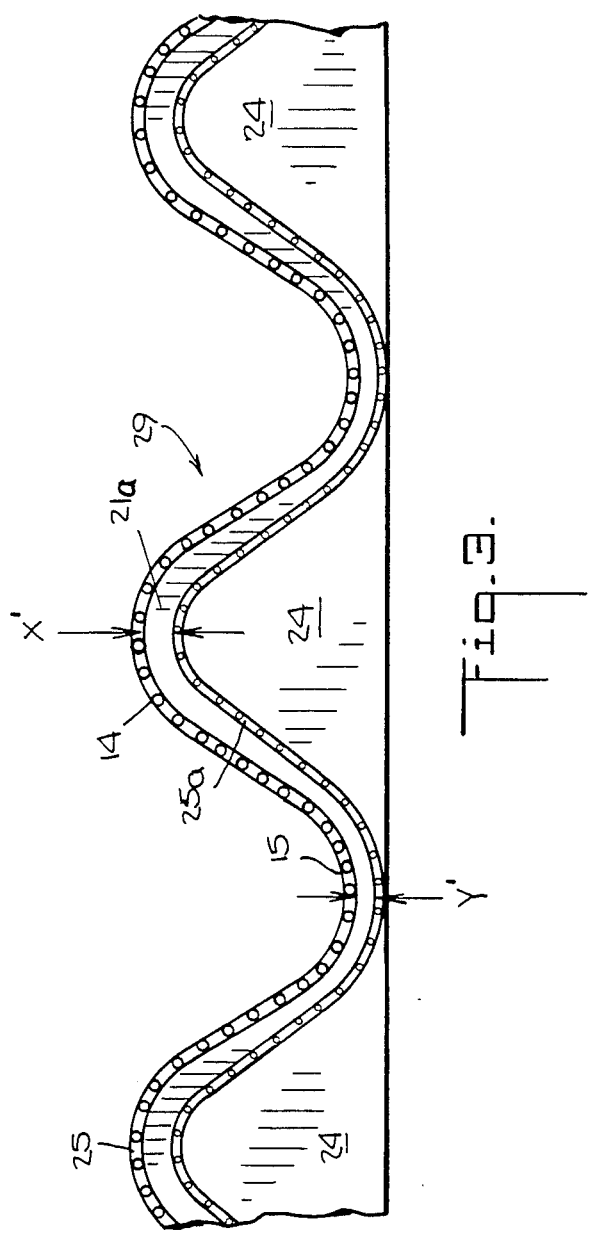

POWER TRANSMISSION BELT AND METHOD

This invention relates to improvements in toothed, fabric covered, power transmission belts. This is a continuation-in-part of my copending application Ser. No. 471,923, filed Mar. 2, 1983, now U.S. Pat. No. 4,514,179.

BACKGROUND

Toothed power transmission belts such as described in U.S. Pat. No. 2,507,852 issued to R.Y. Case and U.S. Pat. No. 3,756,091 issued to Henry F. Miller have been used for many years for the synchronous transmission of power. To obtain maximum belt life in a synchronous type belt, the teeth must be sufficiently rigid to carry the load and yet able to deflect so as to mate properly with the groove of the pulley. Since the internal strength and rigidity of the tooth elastomer is not sufficient to carry the load by itself and certainly does not itself exhibit sufficient abrasion resistance, a fabric cover is conventionally bonded on the surface of the belt. Historically, the fabric cover which has been employed was made from a so-called "stretchable" nylon fabric. The use of stretchable nylon has made the production of such belts economical according to the method described in my U.S. Pat. No. 3,078,206. Belt constructions, in which fabric is stretched to the shape of the belt teeth have been satisfactory for toothed belts used for synchronous drive purposes. However, as toothed belts are used in systems having greater and greater horsepower requirements, the expected life of belts constructed with stretch fabric has decreased substantially. The reason for this is believed to be the following. The conventional stretchable nylon cover which is made with loosely twisted crimped yarn has its interstices substantially enlarged and filled with tooth rubber during the belt molding process. Vulcanization locks the then stretched fabric in place, causing it to become stiff and consequently reducing its ability to deform under load. Under operating loads the belt teeth are however forced to deflect and subject the thusly stiffened fabric cover to excessive dynamic stresses causing premature rupture of the rubber-filled fabric cover, particularly in the tooth root area, resulting in early belt failure. I believe that in belts made according to may aforesaid Patent, approximately 80% of the load on the belt tooth is transmitted by the fabric and only approximately 20% by the rubber tooth itself. This ratio, I believe, concentrates excessive load on the fabric causing the early belt failure at high horsepower application.

In my copending application, Ser. No. 471,923, I have described a belt in which the teeth are covered with a fabric which is substantially non-stretchable in either the longitudinal or the transverse direction thereof, having been treated with a resin which, when it sets, locks the yarns of the fabric to one another and substantially reduces the amount of elastomeric tooth material which can penetrate the interstices between such yarns, whereby the fabric cover, even though it is intially much stiffer than "stretchable" fabric, retains a greater degree of flexibility after the belt fabrication than would conventional stretchable fabric whose interstices were substantially filled with elastomeric tooth material. This allows more of the load to be transferred to the rubber tooth.

By transferring more of the load from the cover fabric to the rubber tooth itself, the load capacity of the belt now became a function, to a greater degree, of the load carrying capacity of the rubber tooth itself. This made it possible to increase the belt life considerably over that of the known belt constructions, for relatively high horsepower applications.

Another construction for curvilinear belt teeth is disclosed by U.S. Pat. No. 4,392,842. According to that invention, the belt teeth are strengthened against shear under high load by constructing the belt teeth with high internal rigidity. This is accomplished by having an added reinforcing layer suspended internally of the belt tooth with a cushion layer of elastomeric material between the suspended reinforcing layer and the jacket, thereby reinforcing the central portions of the belt teeth while allowing their outer surfaces to be flexible.

The preferred protective outer jacket, according to U.S. Pat. No. 4,392,842, was the conventional stretchable cover fabric and this suffered from many of the disadvantages noted above when used to transmit high horsepower load. That is, a substantial portion of the load was still carried by the jacket fabric and subjected the latter to substantial wear at high horsepower loading. The cushion layer of elastomer, of course, helped to reduce such wear but only to a certain extent. The suspended reinforcement layer rigidified the central tooth portion while the stretchable-fabric jacket cooperated with the cushion layer, to achieve substantial improved belt life over that of conventional belts without suspended reinforcement.

It is an object of the present invention to construct a toothed belt having similarly high horsepower capability and even further substantially improved belt life over the belt life obtainable, at such high horsepower, with known belts constructed with either a stretch-fabric jacket and suspended reinforcement on the one hand, or a non-stretch jacket alone, on the other hand.

It is another object of this invention to provide a a belt construction which overcomes drawbacks of prior constructions and in which fabric material cooperates with the elastomeric material of the belt teeth to provide a belt capable of use for relatively high horsepower applications while exhibiting a belt life substantially longer than can be expected with prior belt constructions under similar operating conditions.

SUMMARY OF THE INVENTION

Briefly described, the objects of the invention are met by the provision of an endless positive drive power transmission belt having, suspended within the body of each belt tooth, a layer of reinforcing fabric of the type described in U.S. Pat. No. 4,392,842. The belt is provided with a fabric cover of the type described in my copending application, Ser. No. 471,923. The reinforcing layer is separated from the fabric cover on the surface of the belt teeth, by a cushion layer of elastomeric material which cushion layer facilitates flexing of the outer surface of the belt teeth to conform to the pulley profile as the belt and pulleys mesh.

The fabric cover is substantially non-stretchable in either the longitudinal or the transverse direction thereof, having been treated with a resin which, when it sets, locks the yarns of the fabric to one another and substantially reduces the amount of elastomeric tooth material which can penetrate the interstices between such yarns, whereby the fabric cover even though it is initally much stiffer than "stretchable" fabric, retains a greater degree of flexibility, after the belt fabrication, than would conventional stretchable fabric whose interstices were substantially filled with elastomeric tooth material (i.e., retains a greater degree of flexibility in combination with the elastomer of the belt tooth which it covers than the combination would exhibit if the interstices of the fabric were substantially filled with elastomer).

The belt, according to the present invention, has an elastomeric body portion, a reinforcing tensile member embedded in the body portion, a plurality of teeth of vulcanized elastomeric material integral with the body portion, said teeth having tip regions spaced from said reinforcing member and said teeth separated by land areas, a fabric cover on the outer surface of the belt teeth and land areas and a curvilinear-shaped suspended reinforcing means within each tooth separated from the outer surface of the tooth and from the outer surface of the land areas by a curvilinear-shaped cushion layer of elastomeric material, said cushion layer having a thickness varying gradually between a first given thickness in the region of the land areas to a second substantially greater given thicness in the tooth tip regions, whereby the outer surface of the belt is free to flex as the belt engages its pulleys while the inner portions of the belt teeth are structurally reinforced against tooth shear, said fabric comprising warp and weft yarns and locking means cooperating with the warp and weft yarns for substantially locking them with respect to each other at the intersections thereof for dimensionally substantially stabilizing said fabric, said locking means at least partially obstructing the interstices of said fabric whereby said interstices are substantially free of said elastomeric material, said fabric cover cooperating with said teeth and with said suspended reinforcing means such that the spring rate of each fabric covered tooth having suspended reinforcing means is greater than 1.2 times and less than 3 times the spring rate of such tooth without fabric cover and without suspended reinforcing means. In the preferred embodiment, the suspended reinforcing means is also non-stretch fabric, such as described herein with respect to the cover fabric, including the locking means as described above.

Thus, the improved belt according to this invention comprises in its preferred form a jacket, or cover, and a suspended reinforcing layer each made from a fabric in which the warp and weft yarns are non-textured and are woven and treated in such a way as to minimize the size of the interstices found therebetween. Furthermore, the fabric remains substantially unstressed during the belt molding operation. The result is that during the molding operation the elastomeric tooth material does not substantially penetrate the fabric cover. Consequently, the cover has an improved capacity to deflect with the elastomeric tooth material under load because the adhesion of the cover to the tooth material is believed to be principally chemical and not mechanical, i.e., without significant penetration of the cover by the elastomeric material. The deformation of this so-called "non-stretch" fabric is further enhanced by bias-cutting of the fabric. The improved fabric cover, or jacket, the fabric reinforcing layer and the vulcanized elastomeric belt tooth compound on opposite sides of the reinforcing layer, together, form a composite belt tooth that will deform to such extent that both the reinforced rubber tooth and the fabric jacket share substantially in absorbing the driving forces applied to the belt.

I have found that by thus balancing the properties of the fabric cover, the suspended reinforcing layer and the rubber tooth compound so that the load is more evenly distributed between the two fabric layers and the elastomer of the belt tooth, the aforesaid objectives can be achieved. Such a more balanced construction has greater resilience and less hysteresis than constructions of the prior art in which either the internally reinforced rubber tooth or the covering jacket bear a disproportionately large portion of the load. Since hysteresis energy is well known to cause heating and deleterious effects in rubber and fabric composites subjected to repeated stresses, the reduction of such hysteresis is extremely benefical.

BRIEF DESCRIPTION OF THE DRAWINGS

Preferred aspects of this invention will be described with reference to the accompanying drawings, in which like numerals designate like parts in the various figures and wherein:

FIG. 3 is a side elevational fragmentary view of a pre-formed jacket/tooth/suspended reinforcement, component of a power transmission belt made according to the invention.

PREFERRED EMBODIMENT OF THE INVENTION

Figure 1:
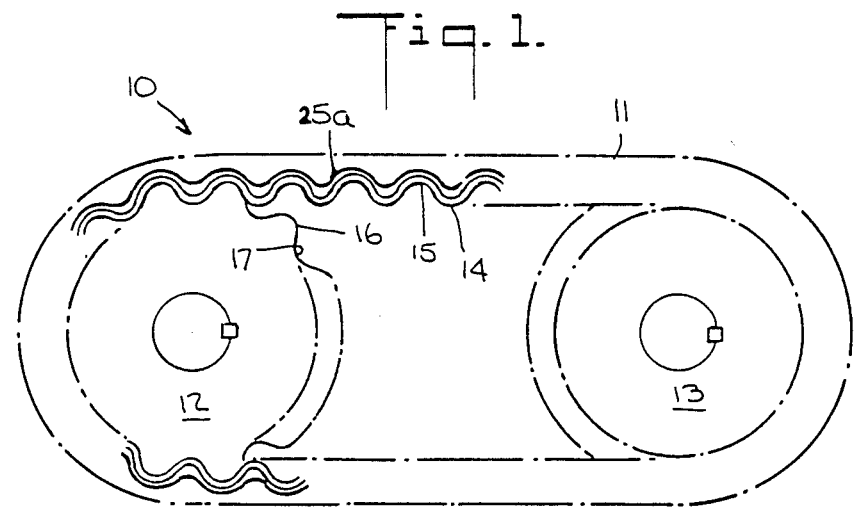
FIG. 1 is a side elevation of a typical power transmission system employing a belt which forms the subject of the present invention.

Referring now to the drawings, in FIG. 1 a belt drive 10 is shown which includes a flexible power transmission belt 11 trained around a pair of pulleys 12 and 13. The belt 11 includes a plurality of alternating teeth 14 and grooves 15 extending generally transversely thereof. The pulleys 12 and 13 have a plurality of alternating teeth 16 and grooves 17, extending generally axially thereof, which mesh or engage with the belt teeth 14 and grooves 15 during the operation of the belt drive 10.

Figure 2:
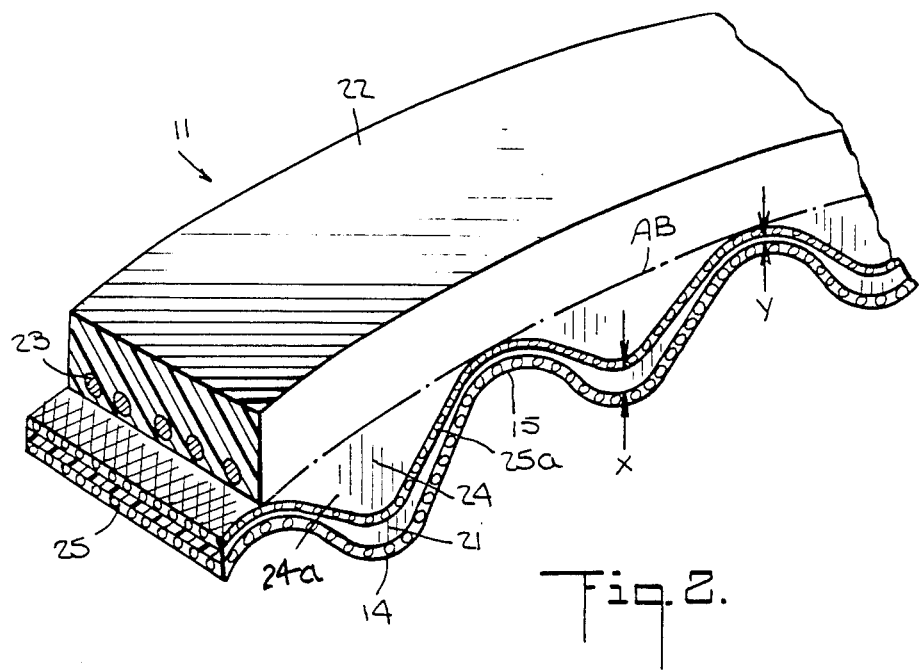
FIG. 2 is a fragmentary, perspective, view of the power transmission belt shown in FIG. 1.

As best shown in FIG. 2, the belt 11 includes a body, or overcord section, 22 of flexible polymeric material. The body 22 of the belt 11 includes a reinforcing tensile layer or plurality of tensile members such as the longitudinally extending and spaced tensile cords 23. These tensile members may comprise essentially inextensible material such as wrapped strands of glass fiber or steel to provide the belt with the necessary longitudinal strength and stability. A plurality of driving teeth 14 of substantially uniform height are integrally formed on at least one surface of the body 22, with the teeth extending transversely of the belt 11.

The tensile cords 23 are disposed substantially on the dedendum line "AB" of the driving teeth 14 of the belt 11 as is well known practice in regard to synchronous drive belts.

Natural or synthetic elastomers suitable for the overcord section 22 and in the tooth body 24 should be compatible although they may be the same or different, such a natural rubber, cispolyisoprene, polybutadiene, poly(butadiene-styrene), polychloroprene, ethylene-propylene copolymer, ethylene-propylene-non-conjugated diene terpolymers wherein the non-conjugated dienes are preferably dicyclopentadiene, 5-ethylidene-2-norbornene or 1,4-hexadiene; poly(ethylene-vinyl acetate), poly(ethylene-alkyl acrylates), chlorinated polyethylene, chlorosulfonated polyethylene, poly)-butadiene-acrylonitrile) (NBR), hydrogenated NBR, polyurethane, fluorocarbon polymers, poly(epichlorohydrin) and the like elastomers. Polychloroprene and hydrogenated NBR are preferred.

A cover fabric 25 intimately fits along the outer surface of alternating teeth 14 and alternating land portions 15 of the belt to form a face cover therefor. This fabric is preferably a balanced cloth fabric consisting of non-textured warp and weft yarns preferably bias-cut so that the warp and weft yarns each make an angle of between 30 and 60 degrees with respect to the longitudinal axis of the belt 11. Each yarn is made up of many filaments. In a preferred embodiment of the invention the cover 25 consists of a wear-resistant fabric in which the warp and weft yarns are nylon and which is a "non-stretch" fabric as will be described in more detail below.

The wear resistant cover layer 25, prior to being formed into a component portion of the belt, is treated with a thermosetting resin, preferably RFL (described below) which is thereafter heat-set to form a locking means to stabilize the structure of the fabric, i.e. to interlock the warp threads and the weft threads.

In accordance with the present invention a reinforcing means or reinforcing layer 25a is suspended internally of the belt tooth 14. The material of reinforcing layer 25a is preferably the same as the material of the protective jacket 25.

Reinforcing means 25a divides the tooth body 24 into a lower portion 24a and an upper portion 21, which latter is referred to as a cushion layer. Cushion layer 21, between reinforcing layer 25a and the outer jacket 25, is preferably of the same material as the remaining elastomeric portions of the belt.

Reinforcing layer 25a provides internal rigidity to the structure of the belt teeth 14 while permitting flexibility in the tip portions and the flank portions of such belt teeth. This allows the surface of the belt teeth to flex and conform to the mating pulley teeth 16 and grooves 17 without damage to the belt teeth as they mesh together.

By having an outer cover layer 25 and an inner suspended reinforcing layer 25a of fabric of generally similar contour, the outer cover layer 25 need not be as heavy, i.e. thick, for the same horsepower characteristics disclosed in my copending application Ser. No. 471,923, since some of the applied forces will now be shared by the inner reinforcing layer 25a. While it was previously preferred to have a cover 25 of fabric having a weight of approximately 11.5 to 13.5 ounces per square yard, it is now possible, in accordance with the present invention, to have an outer cover 25 having a weight of approximately 8.5 ounces per square yard, by making the suspended reinforcing layer 25a of fabric having a weight of approximately 4.0 ounces per square yard. By reason of this construction, the outer portions of the belt teeth 14 are even more flexible and are, therefore, not subject to excessive flank wear or cracking under repeated stress operation. The cushion layer 21 serves to absorb the impact of the pulley teeth as the belt 11 moves around the pulleys 12 and 13. This cushioning further helps to preserve the flex life of the belt teeth and, therefore, to increase the life of the belt.

The location and shape of the reinforcing layer 25a determines the profile of the cushion layer 21. The thickness of such cushion layer varies along the the length of the belt teeth, being thinnest in the land regions 15 and thickest in the tip regions of teeth 14. In FIG. 2, the thickness of the cushion layer 21 at the tooth tip is indicated as "X" and in the land region as "Y". In the preferred embodiment of the present invention "Y" may vary from 0.0005 to 0.003 inch and "X" from 0.020 to 0.025 inch.

The location of the reinforcing layer 25a and the resulting profile of the cushion layer 21 may be varied to optimize the prerformance of the belt depending on pulley diameter, desired horsepower capacity and other application conditions. For example, in high torsional vibration environments, the belt teeth are subject to greater interference forces. Accordingly, "X" should be greater in thickness than in a nonvibration environment, so aas to permit greater belt tooth deflection.

Belts, according to the present invention, may be manufactured as follows. First, a layer of cover fabric 25 (already treated with RFL) and having a rubber coat on one side is laid around the mold and into the cavities formed between the teeth of the mold, with the rubber coat facing outwardly. Such coat is preferably between about 0.003 and 0.012 of an inch in thickness and is preferably the same elastomeric material as used for the remaining elastomeric portions of the belt.

The suspended reinforcing means, i.e. fabric layer 25a, also preferably a rubber coated fabric, is then applied over fabric 25 in the same manner, i.e. fabric layer 25a is positioned around the periphery of the mold and laid into the cavities formed between the teeth of the mold and over the fabric layer 25 which is already positioned there. Suspended reinforcing means 25a is substantially identical to the cover fabric 25, except that it is preferably a lesser weight i.e. thinner, fabric. The thickness of the rubber coat of reinforcing fabric 25a is , however, preferably also between approximately 0.003 and 0.012 of an inch and the reinforcing layer 25a is positioned with its coated side facing the coated outer surface of the layer 25, so that these two rubber coat layers are adjacent each other and together form a rubber layer preferably between about 0.006 and 0.025 of an inch in thickness. At this stage of the assembly the cover fabric and the intermediate reinforcing fabric can be thought of as a laminate of two fabrics having a 0.006 to 0.025 inch elastomeric layer therebetween. In the preferred embodiment this layer is about 0.010–0.020 inch thick.

After the laminated layers are thus laid in the mold, tooth rubber for the remainder of the body portion 24 of the teeth is applied around the mold onto the outer surface of the reinforcing layer 25a for forming the preform member 29, shown in FIG. 3. In forming preform member 29, pressure is applied in the land regions and consequently some of the cushion rubber in the land region is squeezed toward the tooth tip regions, forming the cushion layer 21a which has an X' thickness in the tip region and a Y' thickness in the land regiion, where X X' and Y Y'. The cushion layer 21a in the preform is thus at an intermediate stage and is not yet a fully formed cushion layer 21. This performed unvulcanized component 29, comprising the rubber tooth body 24, the cover fabric 25 and the suspended reinforcement 25a may then be wrapped around a standard mold for making toothed belts as, for example, taught in my U.S. Pat. No. 3,078,206. As part of this procedure, tensile cords 23 are tightly wrapped around the preform 29, in conventional manner and additional rubber, for forming the outer elastomeric body portion 22 of the belt, is applied around the tensile members 23. Then the belt 11 is vulcanized in conventional manner.

When the tensile cords 23 are tightly wrapped around the preform 29 they lie substantially along the dedendum line AB, against the outer surface of the reinforcing fabric layer 25a in the land regions 15 of the belt 11. The tight wrapping of these tensile cords 23 results in much of the unvulcanized rubber between the fabrics being squeezed out of the land regions directly beneath the tensile members and forced into the flanks and more particularly into the tooth tip regions of the belt teeth 14, resulting in final forming of the curvilinear shaped cushion portion 21. Thus, as a result of the pressure applied by the tensile cords 23, much of the rubber coat still remaining in the land regions in the perform 29 is squeezed toward the tooth tip regions, decreasing the thickness of the cusion layer in the land areas (from the thickness Y', in FIG. 3, to the thickness Y, in FIG. 2) and substantially increasing the thickness of the cushion layer (from X', in FIG. 3, to X, in FIG. 2) in the tooth tip regions.

For a 14 mm belt according to my invention, the preferred fabric for the cover layer is a balanced cloth, bias-cut, fabric, having warp and weft yarns of nylon 6,6. The fabric is tightly woven so as to have about 33 warp yarns per inch and about 33 weft yarns per inch. The denier of each of the yarns is about 840, resulting in a fabric which has a porosity of substantially less than 30 cu ft/min of air flow. The fabric is provided with a locking means, namely a resin such as, for example, resorcinol formaldehyde ("RFL") or similar material having adhesive properties for locking together the warp and weft yarns of the fabric at the intersections thereof as well as the individual filaments within the warp and weft yarns. The tightly woven fabric is treated with the RFL, or similar adhesive material, which is then heat-set. After heat setting, the treated fabric is substantially impervious to the flow-through of unvulcanized elastomeric tooth material so that the elastomeric tooth material, when pressed against the surface of the fabric cover at the time the teeth are molded, does not flow through the interstices of the cover fabric. The cover fabric, treated in the manner described above, is nevertheless, capable of being intimately adhered by chemical rather than mechanical bonding, to the outer surface of the tooth rubber.

The preferred fabric for the suspended reinforcing layer is also a balanced cloth, bias-cut, fabric having warp and weft yarns of nylon 6,6, substantially the same as but preferably thinner (i.e. lighter weight) than the fabric for the cover layer. The suspended reinforcing fabric is tightly woven so as to have about 64 warp yarns per inch and about 60 weft yarns per inch. The denier of each of the yarns is about 210, resulting in a fabric which also has a porosity of substantially less than 30 cu ft/min of air flow. This fabric also is provided with a locking means, such as, for example, resorcinol formaldehyde resin and cooperates with such locking means in the same manner as described above with respect to the cover fabric.

The present invention has achieved the surprising result that by the use, both for the jacket and for the suspended reinforcement, of fabric which in its bare and untreated condition is more rigid than conventional "stretchable" fabric and which is made even more rigid by treatment with a resin such as RFL which is then heat-set, the finished belt teeth (with suspended reinforcement) exhibit, in jacketed condition, a greater resiliency, i.e. lower tooth Spring Rate (K), than is exhibited by the jacketed teeth of a conventional belt or even of a conventional belt having a suspended reinforcement (in which both jacket and suspended reinforcement are conventional "stretchable" fabric). Furthermore, the belt according to the present invention has a higher tooth load capacity, i.e. a greater resistance to shear, than the conventional belt. By "conventional belt" herein I intend to include belts made according to U.S. Pat. No. 4,392,842 with conventional stretchable fabric and belts made according to my copending application U.S. Ser. No. 471,923. Thus, despite the fact that one would expect a more rigid tooth structure to result from the use of stiffer, so-called non-stretch fabric, particularly where such fabric is used not only as the outer jacket material but also as an internal suspended reinforcement, such as is the case in the preferred form of the present invention, I am surprisingly able to achieve a more flexible tooth structure in which the Spring Rate (K) of each tooth is greater than 1.2 and less than 3.0 times the Spring Rate of the corresponding tooth alone, i.e. of the otherwise identical tooth excluding both the cover fabric and the suspended reinforcing fabric.

As used herein, tooth Spring Rate (K) is defined as the load (F) applied to the tooth, per inch of belt width, divided by the corresponding belt tooth deformation in inches. The belt tooth deformation is a measure of the deformation of a tooth under a given load. The manner of measuring tooth deformation and determining the Spring Rate (K) for a given belt is described below.

As may be seen from the test results below, belts constructed in accordance with the present invention exhibit a substantially longer belt life than was previously achievable with conventional belts.

TEST RESULTS

In order to compare the performance of belts having conventional stretch-fabric jackets and no suspended reinforcing layer, herein referred to as "A Belts", with those having the construction described in my copending application Ser. No. 471,923, herein referred to as "B Belts", and those having the novel construction of this invention, herein referred to as "C Belts", the following procedure was followed:

"A Belts"

Several positive drive belts were manufactured by conventional methods, as described for such "A Belts" in my copending application Ser. No. 471,923. The "A Belts", after manufacture, were statically and dynamically tested on toothed pulleys of appropriate dimension and configuration as described in Sections I and III below.

"B Belts"

Several positive drive belts were manufactured in accordance with the construction described in my copending application Ser. No. 471,923 ("B Belts"). The "B Belts", after manufacture, were statically and dynamically tested using the same test procedure and apparatus as used for testing the "A Belts".

"C Belts"

Several positive drive sample belts were manufactured in accordance with the present invention ("C Belts"). All the "C Belts" were formed of a chloroprene rubber composition having a nylon fabric cover, a tensile member of fiberglass cords, a suspended reinforcing layer also of nylon fabric and a chloroprene rubber cushion layer of varying thickness between said cover layer and said reinforcing layer. The nylon fabrics for the cover and the suspended reinforcement layers were those described in Section II, item (i), under "C Belts"

below, and the belts were manufactured in accordance with the present invention. The "C Belts", after manufacture, were statically and dynamically tested using the same test procedure and apparatus as used for testing the "A Belts" and the "B Belts".

I. STATIC TEST PROCEDURE

The test stand described in my copending application, Ser. No. 471,923, was used to measure tooth deformation and tooth load as follows: A 28 groove 14 mm pitch HTD pulley as described in Miller, U.S. Pat. No. 3,756,091 is mounted on each shaft and a 1400 mm long, 14 mm pitch, 20 mm wide belt placed on the pulleys and pretensioned to 100 lbs. The needle tipped strain gauge is anchored to the rotatable pulley and the needle inserted along the center line of the selected belt tooth at a distance equal to 24% of the tooth depth below the belt land line. This arrangement allows the measurement of the belt tooth deformation in the direction parallel to the tension member when a torque is applied to the rotatable pulley.

A preload torque of 30 ft.-lbs. is applied to insure that the belt teeth are in full contact with the mating pulley groove flanks. the torque is then increased to 50 ft.-lbs. and the corresponding tooth deformation recorded. This procedure is followed for each of the first 8 belt teeth in mesh. The tooth load on the highest loaded tooth is then calculated for the 30 ft.-lbs. and 50 ft.-lbs. applied torques and the corresponding deformations noted. The tooth Spring Rate (K) is then calculated by using the following equation:

$$K = \frac{F50 - F30}{D50 - D30}$$

where K=Tooth Spring Rate F50=Tooth load in pounds at 50 ft.-lbs. applied torque F30=Tooth load in pounds at 30 ft.-lbs. applied torque D50=Tooth deformaltion in inches at 50 ft.-lbs. applied torque D30=Tooth deformation in inches at 30 ft.-lbs. applied torque The following represents typical results using the aforesaid test apparatus and procedure for "A Belts", for "B Belts" and for "C Belts", in each of the constructions listed.

II. SUMMARY OF TOOTH SPRING RATES CONVERTED TO 1 INCH BELT WIDTH

"A Belts":
(i) Cover: Stretch fabric       K = 15,028 lb/in/in-width
"B Belts":
(i) Cover: non-stretch,         K = 12,395 lb/in/in-width
    non-biased fabric
(ii) Cover: non-stretch,        K = 10,705 lb/in/in-width
    biased-fabric
(iii) Fabric cover removed      K = 4,477 lb/in/in-width
    so as to expose bare
    rubber tooth
"C Belts":
(i) Cover: non-stretch,         K = 10,241 lb/in/in-width
    biased, fabric              (Tooth Spring Rate Ratio:
    (8.5 oz/yd$^2$) having      1.7)
    a rubber coat
    approximately
    0.010 inch thick;
    Suspended
    Reinforcement:
    non-stretch, biased
    fabric (4.0 oz/yd$^2$)
    having a rubber -continued coat approximately
0.010 inch thick
(ii) Cover fabric:              K = 13,229 lb/in/in-width
    non-stretch biased,         (Tooth Spring Rate Ratio:
    biased, fabric              2.2)
    (6 oz/yd$^2$)
    having a rubber
    coat
    approximately
    0.003 inch thick;
    Suspended
    Reinforcement:
    non-stretch, biased,
    fabric (4 ox/yd$^2$)
    having a rubber coat
    approximately 0.003
    inch thick
(iii) Both the cover fabric     K = 6,020 lb/in/in-width
    and the Suspended
    Reinforcement fabric
    removed so as to
    expose bare rubber tooth

III DYNAMIC TESTING

Six "A Belts", three "B Belts" having the B-Belt (ii) configuration above and constructed in accordance with and using the 13.5 oz/yd2 fabric specified in my copending patent application Ser. No. 471,923, and one "C Belt" according to the "C Belt" (i) construction above (all being 14 mm pitch, 1400 mm long and 40 mm wide), were tested under the following dynamic test conditions:

| RPM | 2400 | Torque 158.5 ft.-lbs. |
| HP | 72.4 | Sprockets 36 Grooves - Driver |
| Tension | 195 lbs. | 36 Grooves - Driven | with the following results:

| Average life of "A Belts" tested | 383 hours |
| Average life of "B Belts" tested | 1,702 hours |
| Life of "C Belt" tested | 2,277.5 hours |

The above results clearly indicate that substantialy longer belt life is achieved with the "C Belt" tested, i.e. the belt in accordance with this invention, than with either the conventional "A Belts" or "B Belts".

Similar results are observed especially when hydrogenated NBR is substituted for chloroprene rubber.

IV PREFERRED MATERIALS

In constructing belts in accordance with the present invention the following materials are preferred:

(1) Fabric:
  (a) Fabric Material:
  The warp yarn and the weft yarn for the cover fabric (8.5 oz) are preferably each 840 denier nylon yarn, and the warp and weft yarn for the suspended reinforcement fabric (4.0 oz) are preferably each 210 denier. The tensile strength of the fabric in the warp direction is approximately 790 pounds per inch of fabric width for the cover fabric and 225 lb/in for the suspended reinforcement. The tensile strength of the cover fabric in the weft direction is approximately 730 pounds per inch of fabric width and for the suspended reinforcement, it is about 225 lb/in.
  (b) Fabric construction:

The weave of the fabric is such that it is a balanced cloth. The warp and weft yarns of the cover have approximately 33 ends per inch and 33 picks per inch respectively. The warp and weft yarns of the suspended reinforcement have approximately 64 ends per inch and 60 picks per inch, respectively. The thickness of the cover fabric is approximately 0.019 inch and the thickness of the suspended reinforcement is approximately 0.008 inch. The weight of the fabric for the cover layer is approximately 8.5 ounces per square yard and for the suspended reinforcing layer is approximately 4.0 ounces per square yard and the porosity, measured in cubic feet per minute, using ASTM test method D 737-75, is less than 30 cubic feet per minute of air flow for each of the fabrics.

(c) Air permeability:

Test results comparing fabrics used in making "A Belts" and fabrics used in making "B Belts" and "C Belts", using ASTM method D 735-75, were as follows:

| Air Permeability Test Results | |
|---|---|
| Raw Stretch Fabric | 52.5 cubic ft/min. |
| Treated (but not heat-set) Stretch Fabric ("A Belts") | 39.2 cubic ft.min. |
| Raw Non-stretch Fabric | 7.12 cubic ft/min. |
| Treated and heat-set Non-Stretch Fabric ("B Belts") | 2.68 cubic ft/min. |
| Treated and heat-set Non-Stretch Fabric ("C Belt"-cover fabric - 8.5 oz weight) | 7.7 cubic ft/min. |
| Treated and heat-set Non-Stretch Fabric ("C Belt"-suspended reinforcement - 4.0 oz weight) | 12 cubic ft/min. |

(2) Resin:

Resorcinol formaldehyde latex ("RFL") adhesive is preferred. The RFL used and the manner of its use is preferably that described in my copending application Ser. No. 471,923.

(3) Tooth Rubber and Belt body, i.e. overcord, rubber:

The tooth and overcord rubber may be of the same or of different hardness and is preferably a neoprene blend rubber, as for example the rubber blend disclosed in my U.S. Pat. No. 3,078,206 or hydrogenated NBR. The preferred cushion layer, which is preferably the same material as the remainder of the tooth rubber, has approximately the following dimension:

Cushion layer thickness:

Tooth tip region: 0.020 to 0.025 inch

Tooth land region: 0.0005 to 0.003 inch

Tooth upper flank region: (adjacent tip) 0.019 to 0.020 inch

Tooth lower flank region: (adjacent root) 0.005 to 0.006 inch

The thickness of the skim coat on each of the fabrics is preferably between about 0.003 and 0.012 inch.

(4) Tension Member:

Fibers of polyester, nylon, carbon, boron, aramid, glass, or strands of wire (or blends thereof).

While certain representative embodiments and details have been shown for the purpose of illustrating the invention, it will be apparent to those skilled in the art that various changes and modifications may be made therein without departing from the spirit or scope of the invention.

What is claimed is:

1. A positive drive belt for operating with toothed pulleys, comprising an elastomeric body, a reinforcing tensile member embedded in said body, teeth on at least one surface of said body, said teeth having tip regions spaced from said reinforcing member, said teeth being separated by land areas, a fabric cover on the outer surface of the belt teeth and land areas, a suspended reinforcing means within each tooth separated from the outer surface of the tooth and from the outer surface of the land areas by a cushion layer of elastomeric material, said cushion layer having a thickness varying between a first given thickness in the region of the land areas to a second substantially greater given thickness in the tooth tip regions, whereby the outer surface of the belt is free to flex as the belt engages its pulleys while the inner portions of the belt teeth are structurally reinforced against tooth shear, said fabric cover comprising warp and weft yarns and locking means cooperating with said warp and weft yarns for substantially locking them with respect to each other at the intersections thereof for dimensionally substantially stabilizing said fabric cover, said locking means at least partially obstructing the interstices of said fabric cover whereby said interstices are substantially free of said elastomeric material, said fabric cover cooperating with said teeth and with said suspended reinforcing means such that the spring rate of each fabric covered tooth having suspended reinforcing means is greater than 1.2 times and less than 3 times the spring rate of such tooth without said fabric cover, without said cushion layer and without said suspended reinforcing means.

2. A positive drive belt in accordance with claim 1 in which said suspended reinforcing means is shaped to generally follow the contour of said fabric cover.

3. A positive drive belt in accordance with claim 1 in which the thickness of the cushion layer between said fabric cover and said suspended reinforcing means is 0.0005-0.003 inch in the land region of the belt and 0.020-0.025 inch in the tooth tip region of the belt.

4. A positive drive belt in accordance with claim 1 in which said suspended reinforcing means is a fabric.

5. A positive drive belt in accordance with claim 4 in which said cover fabric is a substantially heavier fabric than said suspended reinforcing fabric.

6. The positive drive power transmission belt of claim 4 wherein each of said fabrics comprise nylon yarn.

7. The positive drive power transmission belt of claim 4 wherein said cover fabric weighs approximately 8.5 oz/yd$^2$ and said suspended reinforcing fabric weighs approximately 4.0 oz/yd$^2$.

8. The positive drive power transmission belt of claim 7, wherein each of said fabrics is a balanced cloth, bias-cut, fabric and comprises warp and weft yarns of nylon 6,6, said cover fabric having a thickness of approximately 0.019 inch and said suspended reinforcing fabric having a thickness of approximately 0.008 inch, and said locking means is a heat set thermosetting resin comprising resorcinol-formaldehyde resin.

9. A positive drive belt in accordance with claim 1 in which the cushion layer between said fabric cover and said suspended reinforcing means is of the same material as the elastomeric material of said body of the belt.

10. The positive drive power transmission belt of claim 1, wherein the spring rate of each fabric covered tooth is greater than 1.4 times and less than 2.8 times the spring rate of such tooth without said fabric cover, without said cushion means and without said suspended reinforcing means.

11. The positive drive power transmission belt of claim 1 wherein said locking means is a heat set thermosetting resin.

12. The positive drive power transmission belt of claim 1 wherein said elastomeric material is vulcanized chloroprene rubber.

13. The positive drive power transmission belt of claim 1 wherein said suspended reinforcing means is a fabric comprising warp and weft yarns and locking means cooperating with said warp and weft yarns for substantially locking them with respect to each other at the intersections thereof for dimensionally substantially stabilizing said suspended reinforcing fabric, said locking means at least partially obstructing the interstices of said suspended reinforcing fabric whereby said interstices are substantially free of said elastomeric material.

14. The positive drive power transmission belt of claim 13 wherein said suspended reinforcing means is a bias cut balanced cloth comprising nylon yarn.

15. The positive drive power transmission belt of claim 13 wherein each of said fabrics is a rubber coated fabric having an elastomeric layer on one surface thereof, approximately 0.003 to 0.012 inch thick.

16. The positive drive power transmission belt of claim 13 wherein said warp and weft yarns of each of said fabrics are woven together such that the woven material, prior to the application thereto of said locking means, exhibits a porosity of less than 30 cu.ft./min. of air flow.

17. The positive drive power transmission belt of claim 1 wherein said elastomeric material is vulcanized hydrogenated poly(butadiene-acrylonitrile) rubber.

18. A positive drive power transmission belt having an elastomeric body portion, a tensile band embedded in the body portion, a plurality of teeth of elastomeric material integral with the body portion and each possessing a predetermined spring rate, said teeth being positioned along a peripheral surface of the belt, a fabric cover formed over the teeth and over the land portions between the teeth, a suspended reinforcing means extending along said belt intermediate said tensile band and said fabric cover, said suspended reinforcing means being shaped to follow the general contour of said fabric cover and dividing said elastomeric material into a cushion layer, between said suspended reinforcing means and said fabric cover, and a body layer, between said suspended reinforcing means and said tensile band, said cushion layer having a first given thickness in the land region between the teeth and a substantially greater given thickness in the tip regions of the teeth, said fabric cover and said suspended reinforcing means each comprising warp and weft yarns and locking means cooperating with said warp and weft yarns for substantially locking them with respect to each other at the intersections thereof for dimensionally substantially stabilizing said fabric cover and said reinforcing means, respectively, said locking means at least partially obstructing the interstices of said fabric cover and of said reinforcing means, respectively, whereby said interstices are substantially free of said elastomeric material, said fabric cover and said suspended reinforcing means cooperating with said elastomeric material of said teeth such that the spring rate of each fabric covered tooth is greater than 1.2 times and less than 3 times the spring rate of such tooth without said fabric cover, without said cushion means and without said suspended reinforcing means.

19. A positive drive power transmission belt, according to claim 18, wherein said cushion layer of elastomeric material has a curvilinear shape whose thickness varies gradually between said first given thickness in the land region and said substantially greater given thickness in the tip region of the teeth.

20. A positive drive power transmission belt, according to claim 18, wherein said cover fabric is substantially thicker than said suspended reinforcement fabric.

21. A positive drive power transmission belt, according to claim 18, wherein each said fabric is an elastomer coated fabric, having a layer of elastomeric material on one side thereof, and said layers together comprising the elastomer material for forming the cushion layer.

22. An unvulcanized preform member, comprising a cover fabric and an elastomer tooth body having suspended therein a reinforcing tensile member, said reinforcing tensile member essentially following the contour of said cover fabric, said cover fabric comprising warp and weft yarns and locking means cooperating with said warp and weft yarns for substantially locking them with respect to each other at the intersections thereof for dimensionally substantially stabilizing said cover fabric.

* * * * *